(12) United States Patent
Turner

(10) Patent No.: US 10,430,979 B2
(45) Date of Patent: Oct. 1, 2019

(54) METHOD FOR CREATING CAMOUFLAGE PATTERNS

(71) Applicant: Nate Turner, La Cruces, NM (US)

(72) Inventor: Nate Turner, La Cruces, NM (US)

( * ) Notice: Subject to any disclaimer, the term of this patent is extended or adjusted under 35 U.S.C. 154(b) by 0 days.

(21) Appl. No.: 15/908,588

(22) Filed: Feb. 28, 2018

(65) Prior Publication Data

US 2019/0266758 A1 Aug. 29, 2019

(51) Int. Cl.
*G06T 11/60* (2006.01)
*G06T 11/00* (2006.01)

(52) U.S. Cl.
CPC ............ *G06T 11/001* (2013.01); *G06T 11/60* (2013.01)

(58) Field of Classification Search
CPC .................................................. G06T 11/001
See application file for complete search history.

(56) References Cited

U.S. PATENT DOCUMENTS

| 6,353,689 | B1 * | 3/2002 | Kanamaru | G06T 5/10 382/280 |
| 7,775,919 | B2 * | 8/2010 | Oswald | F41H 3/00 428/919 |
| 9,418,399 | B1 * | 8/2016 | Perciballi | G06T 11/60 |
| 2003/0123698 | A1 * | 7/2003 | Murakami | G06T 1/0064 382/100 |
| 2008/0138604 | A1 * | 6/2008 | Kenney | G06K 7/12 428/323 |
| 2009/0313740 | A1 * | 12/2009 | Santos | F41H 3/00 2/69 |
| 2012/0132063 | A1 * | 5/2012 | Saucedo | F41H 3/00 89/36.02 |
| 2014/0129030 | A1 * | 5/2014 | Zhuge | G05D 19/02 700/275 |
| 2015/0116321 | A1 * | 4/2015 | Fortner | F41H 3/00 345/420 |
| 2015/0308967 | A1 * | 10/2015 | Nagai | G01N 23/04 378/36 |
| 2015/0310277 | A1 * | 10/2015 | Schertler | G06K 9/0063 382/128 |
| 2016/0140718 | A1 * | 5/2016 | Ishida | H04N 13/239 345/419 |
| 2018/0068480 | A1 * | 3/2018 | Cincotti | G06T 11/60 |

* cited by examiner

*Primary Examiner* — Phong X Nguyen
(74) *Attorney, Agent, or Firm* — Lathrop Gage LLP

(57) ABSTRACT

A system and method for generating a camouflage by integrating the phase data of a Turing pattern, containing data at multiple levels of scale, with Fourier frequency data corresponding to that of the environment(s) in which the camouflage is to be employed.

20 Claims, 10 Drawing Sheets

METHOD FOR CREATING CAMOUFLAGE PATTERNS

PROBLEM

Camouflage patterning has been found to perform best when it incorporates both symmetry-disrupting elements to break up the shape being camouflaged and texture-matching elements to fit the geometry of the background.

Currently, the only known method that satisfies both requirements uses box counting with a limited color set, which is ineffective if the texture-matching elements are too large to fit into the architecture employed for symmetry-disrupting.

Fourier transform based camouflage patterns have been developed which satisfy texture-matching requirements, but not symmetry-disruptive requirements.

SOLUTION

The method of the present invention employs a Fourier-based camouflage generation methodology which incorporates a Turing (Reaction-Diffusion derived) omnidirectional macropattern, allowing for a full Fourier power spectrum, including the incorporation of elements larger than the desired macropattern, without compromising blending or disruptive effectiveness.

Visually disruptive patterning delays or defeats recognition of the human shape once it is picked out from a background. Fitting small shapes (on the scale of leaves, gravel, twigs, etc) into a larger pattern is trivial, but fitting large shapes (on the scale of dunes, building sides, cloud shadows) into a pattern smaller than them will make the pattern indistinct with traditional methods.

The method described herein generates and composites Turing patterns, generated at multiple radii, into a single image, which can be used as phase data for a camouflage pattern. Typically, a generated image containing all elements of scale will be organized in a randomized fashion, without sharp transitions, which is not ideal for camouflage. However, the present method for generating Turing patterns discards all but a small range of image frequencies (elements larger and smaller than the pattern's chosen radii are discarded). The generation of multiple Turing patterns, all from a single source image but each with a different scale, results in numerous Turing patterns of different frequencies that will align with each other when overlaid.

The present method allows elements larger and smaller than a macropattern to be fitted into it, both reinforcing the pattern's edges to create contrast and the illusion of depth, and creating broad-scale color changes across the pattern to help break up the wearer at longer distances; the blending advantage of a fully accurate power spectrum can thus be employed with disruptive patterning, without loss of larger shapes or disruptive effectiveness.

DETAILED DESCRIPTION

Figure 1A:
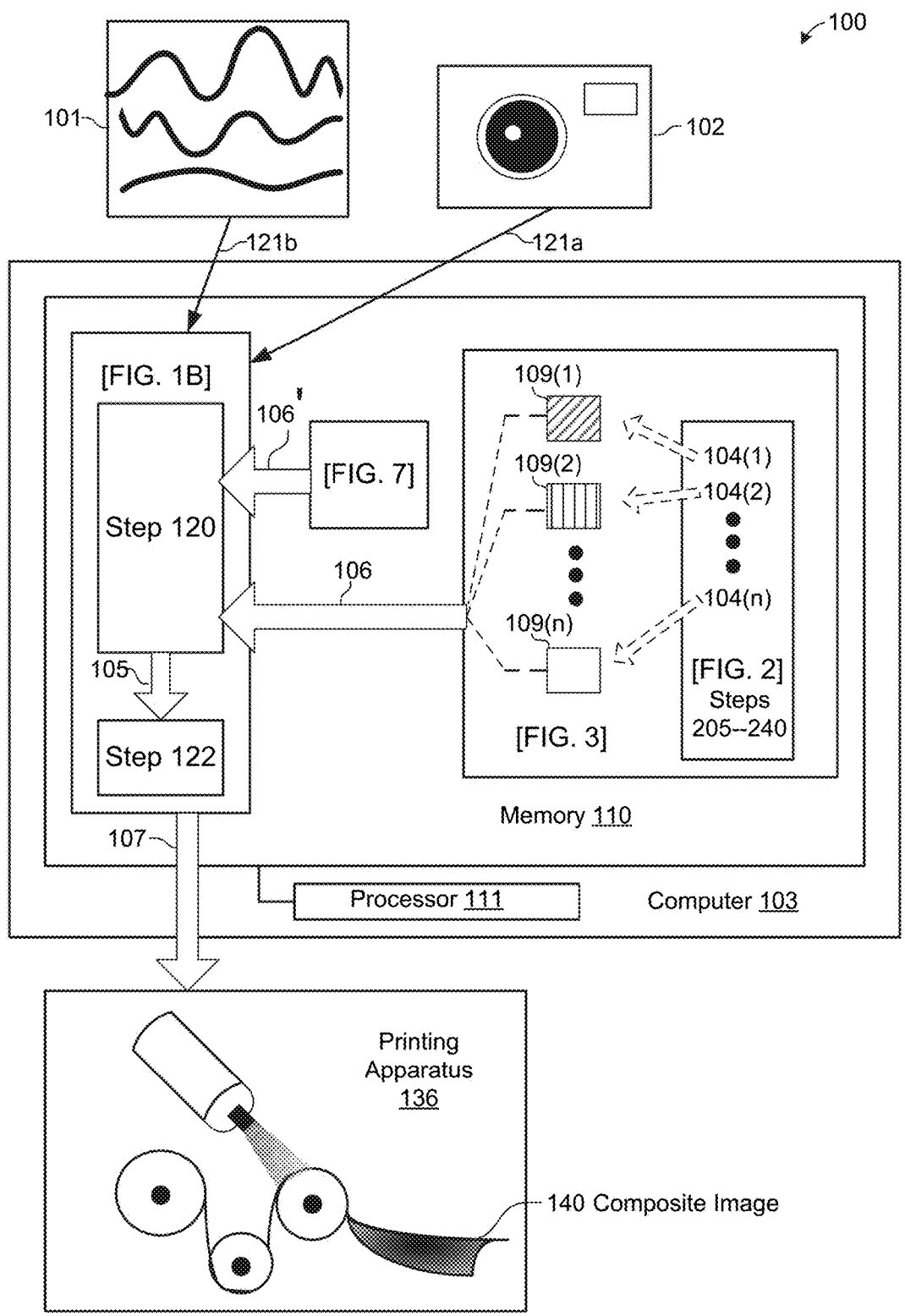
FIG. 1A is a system diagram showing an exemplary environment in which the method of the present embodiments may be performed.

FIG. 1A is a system diagram showing an exemplary environment 100 in which the method of the present embodiments may be performed. As shown in FIG. 1A, either raw frequency data or a predetermined pattern may be used for pattern input.

Blocks 101 and 102 represent typical system inputs. Block 101 illustrates a range of sine waves, as would be found in a Fourier or discrete cosine transform-based set of frequency data 121. Block 102 is a camera, as photographs of exemplary scenarios may also be employed to yield frequency data 121 via Fast Fourier Transform (FFT). Frequency data 121 may encompass red, green and blue frequency data or grayscale from a single environment (signal 121a), or may encompass data (signal 121b) from multiple environments, with each in a different channel.

Figure 1B:
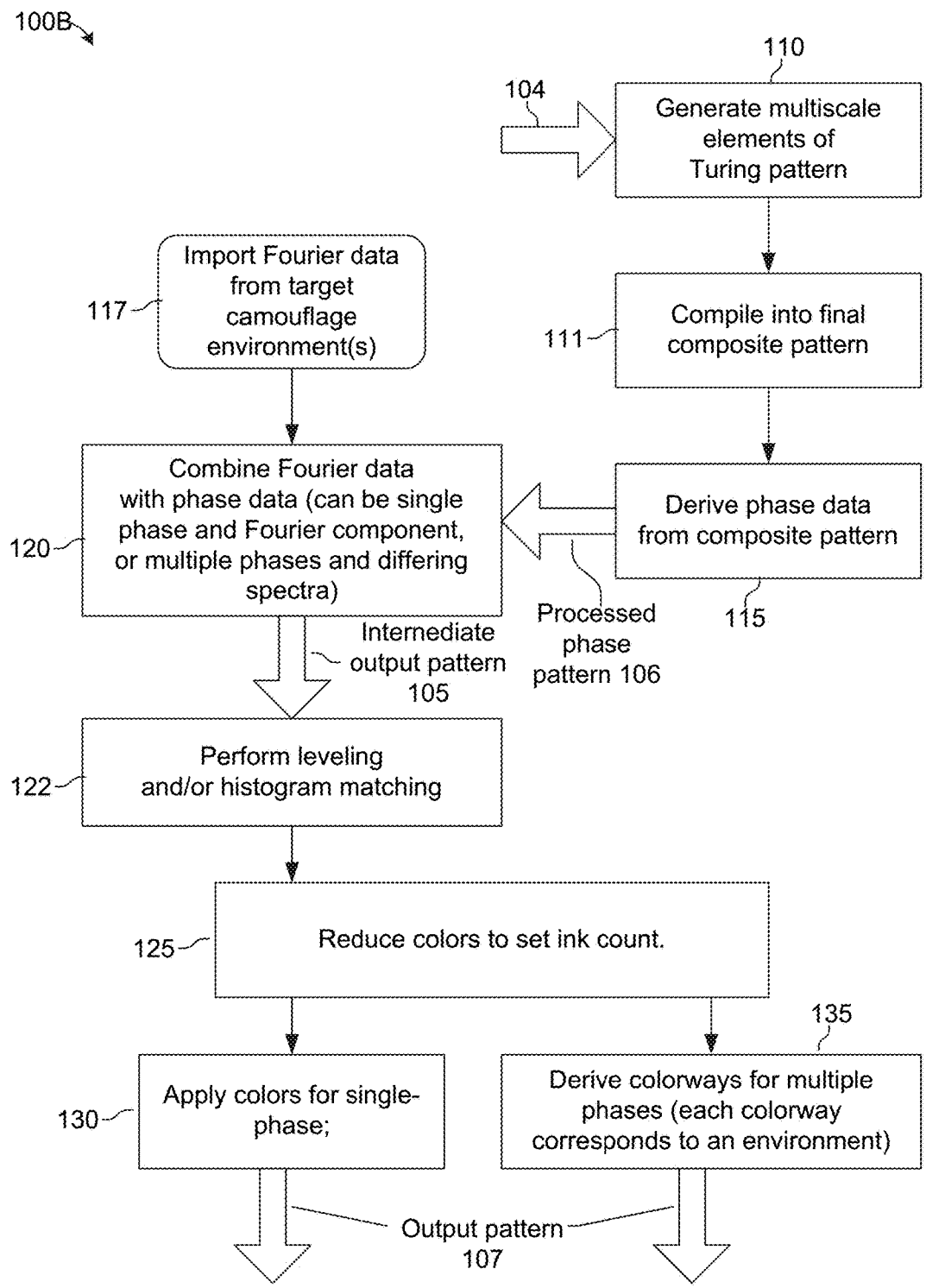
FIG. 1B is a flowchart showing an exemplary set of steps for matching a pre-generated Turing-pattern-based symmetry-disrupting geometry to a desired Fourier power spectrum for texture matching and an associated color space, or for matching multiple pre-generated geometries to multiple dimensionalities for a pattern that can be recolored to fit environments of different fractal dimensionality.
Figure 2:
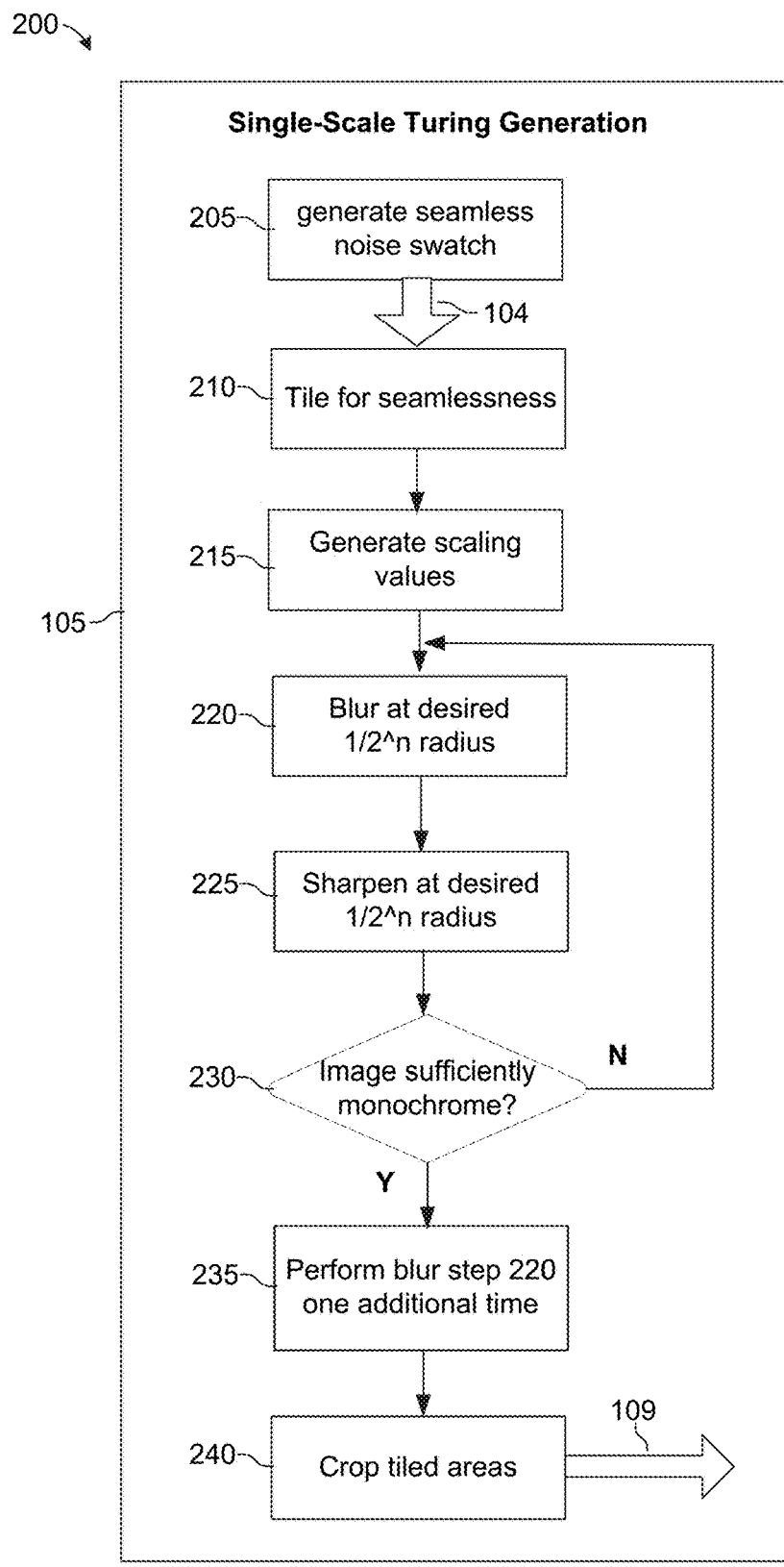
FIG. 2 is a flowchart showing an exemplary set of steps for generating a single-scale Turing pattern for from a given sample; optimally random noise with multiple levels of scale, such as a diamond-square algorithm or Perlin noise.
Figure 3:
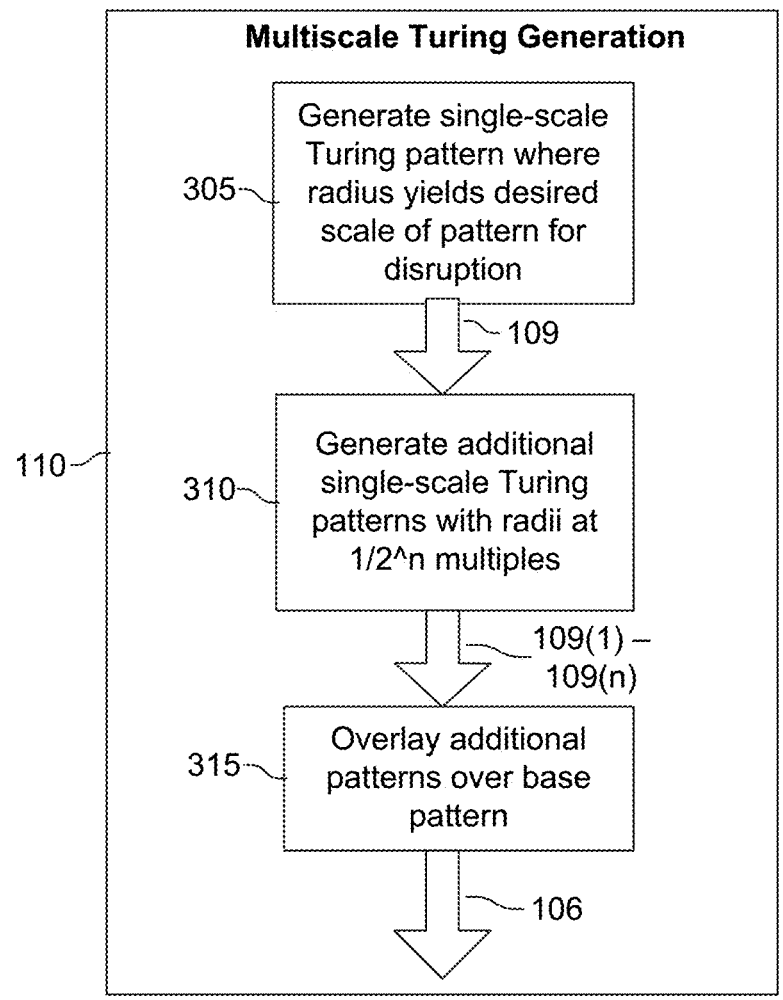
FIG. 3 is a flowchart showing an exemplary set of steps for integration of multiple scale Turing patterns into a finished symmetry-disrupting geometry, whose phase is suitable for implementation with any desired Fourier power spectrum to produce a symmetry-disrupting pattern with the desired texture-matching characteristics.

Block 103 encompasses the computer apparatus, with pattern compositing as shown in FIG. 1B, Turing pattern assembly as shown in FIG. 2, and multiscale Turing element generation, as shown in FIG. 3. The methods and algorithms shown in the accompanying flowcharts are implemented as machine-readable instructions stored within computer memory 112 and executed by processor 111 to perform the methods described herein.

One or more input pattern(s) 104(*) [where "*" indicates a specific pattern] are processed via FIG. 2, described below. The number of input patterns 104 may vary; depending on the workflow. In one embodiment, the resulting input pattern 104 may comprise one input pattern 104(1) or a number of input patterns, 104 (1)-104(n), to be processed. The resultant pattern or patterns are hereinafter referred to simply as input pattern 104.

Figure 7:
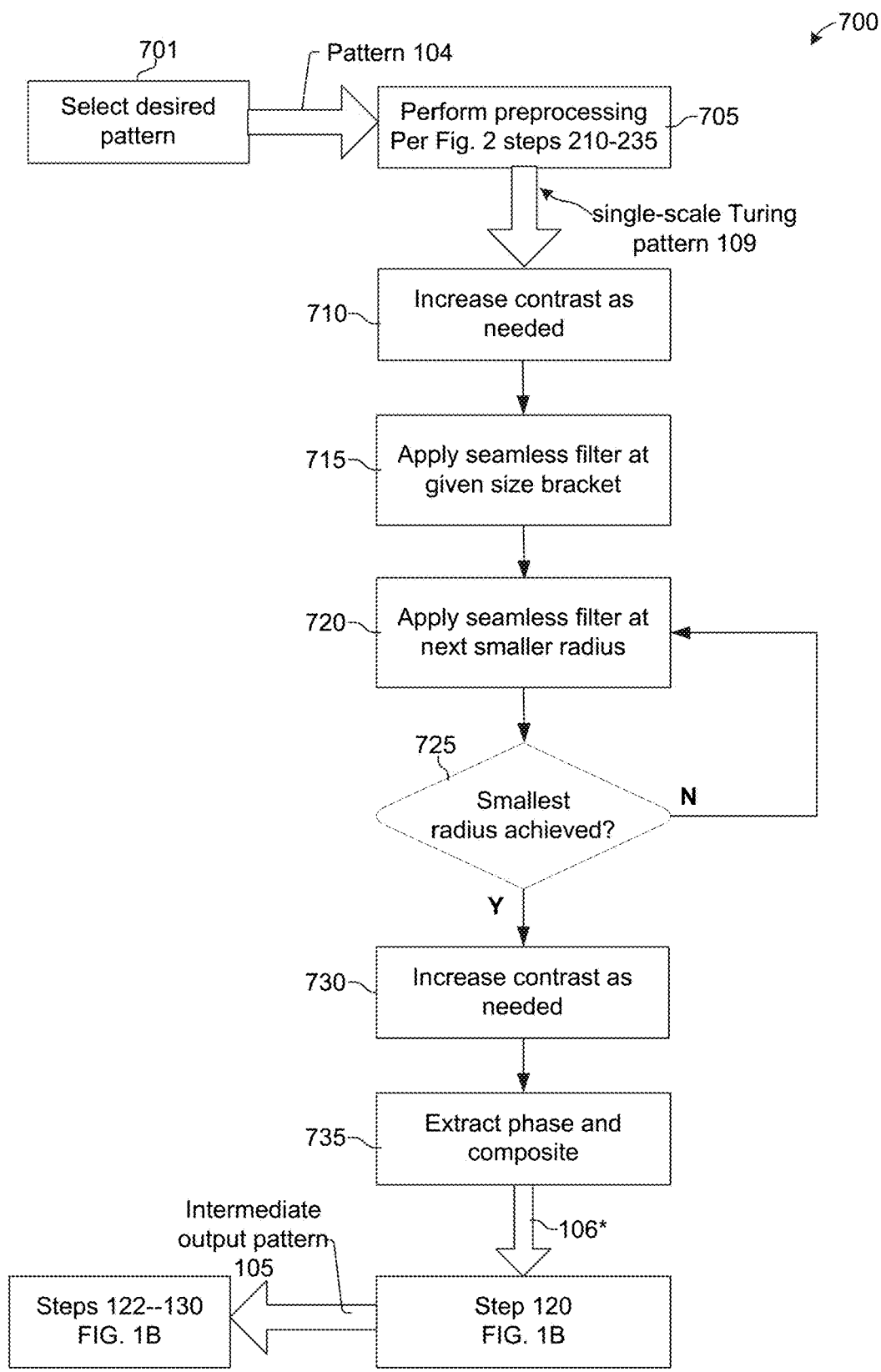
FIG. 7 is a flowchart showing exemplary steps performed in generating a multiscale Turing pattern.

A single-scale Turing pattern 109 is generated via steps 210-235 (see FIG. 2 description, below), either as a component of a composite pattern (FIG. 3) or as a standalone pattern (FIG. 7). Patterns 109 are processed via FIG. 3 into processed phase pattern 106.

Processed phase pattern 106 is the result of performing the process on Input pattern 104 such that it is suitable for combination with a given Fourier spectrum. Processed phase pattern 106 may also include alterations to the processed results from pattern(s) 104 made subsequently, or in addition to, the cycles performed on pattern(s) 104.

Signal 105 is an intermediate output pattern, including the Inverse Fast Fourier Transform of the frequency spectrum of choice from inputs 101 or 102 with the phase derived by applying steps 210-240 (described below with respect to FIG. 2) or steps 702-706 (described below with respect to FIG. 7) to input pattern 104. Signal 105 undergoes further postprocessing, detailed in steps 122-135, to yield an output pattern 107.

Output pattern 107, suitable for processing via stencil and printing apparatus, is a signal that may include multiple grayscale channels composited together. Each channel may be assigned a separate color channel, such as a set of inks being printed onto fabric, or may serve as the basis for stencils for the application of different colors of paint.

Intermediate Pattern 909 is the result of performing a blur-sharpen algorithm on a Turing pattern with dissimilar scale to the algorithm being performed.

Composite pattern 919 is the result of pattern 909 being processed at all desired scale levels.

Block 136 shows an example printing apparatus, which can include traditional screen printing or inkjet printing onto fabric or adhesive panels, or spray-painted stencils for use on materiel, all possible implementations.

Block 140 depicts the finalized print product (composite image 140) as rendered by a suitable printing method.

FIG. 1B is a flowchart showing an exemplary set of steps 100B for matching a pregenerated Turing-pattern-based symmetry-disrupting geometry to a desired Fourier power spectrum (from blocks 101-102), or for matching multiple pre-generated geometries to multiple dimensionalities to generate an intermediate output pattern 105 that can be recolored to fit environments of different fractal dimensionality. The combination of environmentally-derived frequency data and the pregenerated Turing pattern, followed by subsequent postprocessing, forms the camouflage pattern. The steps in FIG. 1B may be performed, for example, using Adobe Photoshop® CS5 with a Fast Fourier Transform plugin.

To properly disrupt the shape of a human or a piece of military hardware, for example, it is preferable to have a pattern that crosses over the visual skeleton (or symmetry axes) of the figure or object at issue. Vertical stripes on a primarily horizontal zebra are a good example of this patterning, as are horizontal "tiger stripe" camouflage patterns on vertical human bodies.

However, a pattern with a single dominant direction may clash with the dominant direction of the elements in the surrounding environment. It also restricts the manner in which uniforms can be cut, resulting in fabric wastage. For this reason, a Turing pattern is selected, as it contains long elements that will cross over the body's visual skeleton while not having any single dominant orientation. This makes the final Turing pattern generated using this method more flexible in differing environments with different bodily orientations, and allows for more options when cutting clothing or applying stencils.

Since the scale of a human or piece of equipment will remain constant in relation to an applied camouflage pattern, a fixed set of element sizes can be used to break up the body, such as large elements to quarter the shape into segments at long range, and/or stripes with about the width of human limbs to cross over the distinctive long elements of the body.

However, natural environments contain a wide range of sizes, which can be approximated via fractal geometry. These may be larger, smaller, or intermediate in relation to this disrupting pattern. If they are not integrated into the symmetry-disrupting patterning, they may create visual noise or conflict with that pattern, reducing or even neutralizing its effectiveness.

Thus, in order to function optimally, a pattern should integrate all textural element sizes into forming its symmetry-disrupting geometry.

In step 110, Initially, steps 210-240 of FIG. 2 are performed on several iterations of input pattern 104. This procedure generates various elements of the final Turing pattern, in the form of several single-scale Turing patterns, each of a different radius. The result is a set of similarly-configured single-scale Turing patterns, processed from input signal 104, differing in scale.

In step 111, the set of patterns processed from signal 104 as outlined in the introduction to FIG. 1B is compiled into a processed phase pattern 106, with all visible layers being merged into a single layer. Step 111 is shown in greater detail in FIG. 3, described below. The result is processed phase pattern 106.

In step 115, once a pattern is generated, phase data must be derived from this composite pattern so that it can be used to organize the texture-matching pattern around a preferred geometry. In one embodiment, if one is generating a non-square pattern (such as if one is using a 5:3 ratio for 1500×900 mm fabric runs), the pattern is stretched along its short axis to fit a square geometry with sides that are multiples of 128. As Photoshop CS5's filters are repeatedly applied at 128 mm intervals, this procedure allows for a seamless behavior when using filtering, and minimizes artifacts at the edges of Fourier-transformed patterns 105 and 107.

A Fast Fourier Transform (FFT) algorithm is performed, and the channel of the result corresponding to the phase data is carried over into the next step.

In step 117, Fourier data (from input 101 or derived from input 102) is imported that corresponds to target camouflage environments. Such data may be derived from power laws, such as a Pareto distribution (from input 101), but Billock et al. suggest that an overly simple geometry would lend itself to mathematical deconvolution, allowing an adversary to mathematically mask a pattern out of an image and thus de-camouflage the object or wearer. For this reason, Fourier data derived from environments (from input 102) may be a better option, both as it is more complex and difficult to approximate mathematically, and as an attempt to mask out a pattern that has identical geometrical features as its background will also result in neutralization of the background. Such a level of perfect matching is unlikely to be possible, but approximating it will increase a pattern's effectiveness nonetheless.

Fourier data may be sampled from multiple images of the same resolution (Input 102), then averaged. Fourier data should be sampled from images with the same or greater resolution than the pattern being generated, in order to avoid blurriness in the final pattern. If a pattern has a strong directional bias, and one desires to camouflage an object that may change its orientation (such as a person who may be walking upright or lying prone), the frequency data derived from the environment may be radially blurred to average out its directionality.

Next, if one is designing a pattern that is non-square (e.g., a 5:3 ratio for a 1500×900 mm fabric screen), the Fourier spectrum data (with the exception of the central DC term) will need to be compressed in the same direction, and by the same amount, and then pasted onto a background-valued square region measuring the longest dimension on each side. This will allow the final pattern to fit into a non-square shape, tile properly without artifacts, and lack an unwanted directional bias.

Fourier data may be color, as when the red/green/blue channels of an image (e.g., input 102) are each sampled for data, or it may be grayscale. If one desires multiple texture-matching options, each color channel may be slaved to a different Fourier frequency spectrum as well. However, if this last option is used, multiple differing symmetry-disruptive patterns should be generated, all of the same proportion and scale, but with a different pattern for each frequency spectrum being used. An example of this would be one geometry matched to a primarily large-scale frequency spectrum in the red channel, another geometry matched to an intermediate frequency spectrum in the green channel, and a third geometry matched to a dense, small-scale frequency spectrum in the blue channel.

In step 120, once the desired Fourier frequency data (inputs 101, 102) and phase data (derived from signal 106 via Fast Fourier Transform [FFT]) have both been gathered, they may be combined via IFFT (Inverse Fast Fourier Transform) to produce the final geometry (by, for example, performing steps 210-240 shown in FIG. 2, or in an alternative embodiment, steps 705-725). Both the Fourier frequency data and the target geometry should have the same geometrical size, and if they are distorted for non-square geometries, both should be distorted along the same axis (symmetry-disrupting data should be stretched along the short axis to match its widest axis prior to deriving its phase data; texture-matching frequencies should be compressed along that same axis to the same proportions and fitted onto a square image of the initial size). The target geometry and Fourier frequency can be integrated on a channel-by-channel basis, then assembled into an intermediate output pattern 105. If the FFT plugin being used produces variable alpha values in the IFFT's result, stacking duplicates of the result can be used to render the result opaque, and a merged, opaque stack of the duplicate can be composited onto a black background.

If the input pattern 104 or input 101/102 originally had a non-square geometry, intermediate output pattern 105 will appear to be stretched; both the desired geometry and the texture-matching elements will be elongated along the stretched axis. Resizing the intermediate output pattern 105 to its original proportions will compress this axis to the desired degree.

After the above steps have been performed, the resulting intermediate output pattern 105 should tile seamlessly with itself on both the horizontal and vertical axes.

If Fourier data has been derived from multiple images and averaged, it may have reduced amplitude (variation in lights, darks, and divergences from average color) with respect to a given source image.

If multiple frequency spectra are used, they may differ in overall brightness or contrast, such as if one channel is derived from a low-intensity, primarily midtone-based desert environment, another from a high-contrast woodland environment, and a third from a mostly-white snow environment. This potentially reduces the weighting of one frequency spectrum's elements relative to another, which would compromise the effectiveness of output pattern 107 in that setting.

In step 122, Auto-leveling may be used to match all channels to an average 50% luminance, and stretch their most extreme light and dark values to pure white and pure black. For a color image, histogram matching can be used to fit its contrast and color to environmental data, either from pre-derived data, or by color matching to a contact sheet of all images sampled.

Histogram matching can result in color artifacts, so editing may be needed to remove them, such as via manual color replacement or noise-reduction algorithms.

In step 125, the intermediate output pattern 105 is prepared for the medium it will be printed in signal 136. This typically involves reducing color count to a set number, corresponding to print inks or paints. Sample media include painting or printing, either with inkjet-type printing that mixes inks together to generate a target color, or with conventional fabric printing of camouflage, which uses a set number of inks, each customized to produce the color in question (along with desired infrared, near-infrared, short-wave-infrared, and/or ultraviolet spectral properties). If the medium in question has a limited number of colors it may be printed in (such as paints or inks), or if histogram matching is insufficiently effective at matching colors, colors may be reduced. Colors may be reduced with a desired amount of dithering if desired, or they may be reduced without dithering if printing with color dithering is technically prohibitive.

In step 130, color data for a full-color, single-environment is sampled from source images, or drawn from a preexisting table of usable colors. This is applied directly in the case of a single-environment pattern.

In step 135, for an output pattern 107 that can be slaved to a number of different colorways, the colorways needed for the multiple phases are derived with each colorway corresponding to a differing environment. In cases such as a multiple-Fourier-spectra image, the process is performed via an algorithm, such as adaptive color reduction, or a preselected palette whose red, green and blue values correspond to proportions desired in the final colorways.

Once this has been performed, a given channel (red, green or blue) is consulted for applying the colorway best suited to displaying that Fourier spectrum. Since each channel will only contain grayscale data, the colors should be applied according to relative intensity, with the darkest region receiving the darkest color, the second-darkest region receiving the second-darkest color, and so on to the lightest region receiving the lightest color.

If an environment requires or fits the frequency data in a channel, but the channel is dark-dominant for a light-biased environment (or vice versa), the channel may be color-inverted before recoloring.

Once the intermediate, Fourier-composited pattern has been given the needed color characteristics and indexed to the desired number of output colors, the result will be a multi-channel image constituting the output pattern 107. As noted above and outlined in FIG. 5, the camouflage pattern may be configured to support a number of different colorways (different assignments for its indexed channels to generate alternate patterns from the same image).

FIG. 2 is a flowchart showing an exemplary set of steps 200 for generating a single-scale Turing pattern 109 from a given sample, which optimally, is random noise with multiple levels of scale, such as a diamond-square algorithm or Perlin noise.

In step 205, input pattern 104 is generated. In this exemplary workflow, input pattern 104 is in the form of a seamless swatch of noise that can be tiled repeatedly, and that has data at multiple levels of scale. To generate multiple Turing patterns that can be integrated effectively, a single seed value needs to be generated. It should be generated at the desired final resolution of the pattern, or as close as practicable. In Photoshop, for example, Perlin noise (clouds) generation cycles at 128-pixel intervals, and thus if a seamless pattern is desired, each side must be an integer multiple of 128; rounding up to fit the nearest possible value, then resizing the finished pattern, is acceptable.

Similarly, if a non-square pattern is being generated, such as for a 1500×900 mm screen, the pattern can be generated at a sufficiently high-resolution multiple of the ratio between them, such as, in this case, 1920×1152 pixels.

If multiple Turing patterns from differing seed values are desired, such as for a multiple-colorway pattern, they should be modified via FIG. 2 steps 210-240 separately before being composited, as color preservation is lost during the workflow of FIG. 2.

As long as the pattern tiles seamlessly, various options can be used for seed values. Perlin noise performs acceptably. A diamond-square algorithm (plasma cloud) should perform similarly, as both contain features at all levels of scale (large and small). A photograph or manually generated pattern could be used, or could be composited into the material, so long as it had a sufficiently varied number of element sizes, or as long as a different seed were used for the size brackets where the image did not contain any scale data.

Gaussian noise should not be used as a sole basis for a pattern. While it contains the needed frequency data, the pattern needs to be integrated through several blur cycles, which will average the Gaussian noise to a single flat grey tone and lose any compositional data.

Since many of the filters used cannot sample data across image boundaries, a Turing pattern generated from a single iteration would fail to tile properly as its boundaries would be matched to an edge rather than to the area they were blending into. Thus, the raw data, such as Perlin noise, that will be used to generate the final Turing pattern needs to be tiled. As shown in FIG. 2, at step 210, seamless seed image tiling can be achieved by resizing the canvas to twice its original dimensions and tiling the seed value across it, resulting in a 2×2 repeat. The seed image may be kept in the center, with duplicates arranged around its radius, or it can be duplicated into four images and fitted into the corner quadrants of the image. The results will not be affected, apart from where the repeat starts or stops, and since the final image will tile seamlessly this can be changed afterwards.

Step 215 includes the generation of the desired scale levels to be implemented in further steps. A description of scaling law is herewith provided as a guide. The radius will be discussed in terms of the equation k/f^beta, and in the equation, k shall equal 1, f shall equal 2, such that the equation discussed reduces to $\frac{1}{2}^n$. The features' scale are described in $\frac{1}{2}^n$ multiples of the base radius, to be derived in step 305. Here, n is a placeholder for the variable commonly referred to as beta. Any value can theoretically be assigned for n, but an overly large value (>2) would result in too much difference in scales between feature sizes, which would compromise texture matching, and a too-small value (<0.5) would result in a prohibitive workload as it would require the generation of numerous layers.

Billock et. al. record values of natural terrains to have beta/n values ranging from 0.9 to 1.2, with the weighted average falling at approximately 1.08. Producing a pattern using this value will make it more effective at fitting environments whose size elements have this beta value as well.

The given $\frac{1}{2}^n$ value for a selected beta/n is multiplied by the selected base radius. For a base value of 64, an n of 1.08, and an iteration of the pattern that is two scales smaller than the base, the mathematics would be performed twice over, so that the result would be $$[64*/(2^{\wedge}1.08)]/(2^{\wedge}1.08)=14.32 \text{ (approximate)}$$

For a base value of 48, an n of 1.2, and an iteration one scale larger than the base, the scale variable would be 0.5, so the result would be $$48*2^{\wedge}1.2=110.275 \text{ (approximate)}$$

Using a range of scales, a desired base radius, and a desired beta/n value, a table can be generated of other radii fitting a $\frac{1}{2}^n$ curve centered at the base radius. Practically, this is bounded at its top value by a number so large that it acts across a radius larger than ½ the pattern height or width, so that the tiled image will still produce artifacts. If this bound needs to be overcome, a greater than 2×2 tiling of this pattern can be produced expressly.

This method is bounded at its lowest radius by radii below 0.5, such that image sampling does not sample areas outside of a given pixel when acting on it. If a lower bottom value is desired, resizing the tile in accordance with the above equations allows for smaller values to be generated, then resized to fit the original form factor. Similarly, if program limitations do not allow for a radius as large as is needed, the image may be resized proportionately before applying the following steps, then returned to its original size when finished.

If there is a resolution limit expected due to the range from which the pattern will be observed, such that smaller elements will not be perceptible or will reduce edge salience for the pattern elements, the smallest radius may be selected to match this condition.

In step 220, using the desired value found in the method outlined in FIG. 2, as well as a seamless tile of the pattern, a Gaussian Blur filter is applied at the radius found in step 215. For the first iteration of step 220 for a given scale, one should use an unaltered tile of the source produced in Step 210. Subsequent implementations, as will be detailed in step 225-step 240, will use the result of progressive alteration of this tile. When returning to step 220 from step 230, do not use an unaltered tile; use the tile that resulted from subsequent steps leading to the latest arrival at step 230.

In step 225, the image resulting from step 220 is used. A Smart Sharpen filter is applied at relatively high intensity (500% is acceptable) and at the radius used in step 220.

Steps 225 and 220 may be implemented in the reverse order, with the sharpen filter initially implemented prior to the blur filter.

In step 230, the procedure started in steps 220-225 is continued, and the result is assessed for the desired monochrome characteristics and to ensure its shapes are smoothly distributed and consistent in scale (if the pattern contains larger elements than the radius being worked with when viewed at a reduced size, or contains striping or junctions that are gray rather than black or white, continue).

Turing patterns form progressively based on reaction-diffusion processes, and so in the course of processing, an image will shift from a purely seed-value-based appearance to a final pattern, with one level of scale (determined by the radius used), a characteristic branching/labyrinthine patterning, and a relatively monochromatic color palette when exiting Step 225.

The Turing formation will not occur on the first step, and so step 220 and step 225 will need to be performed repeatedly in an alternating fashion, generating a blur-sharpen-blur-sharpen cycle that progressively weeds out other frequencies, pushes colors to dark or light values, and importantly, joins pattern elements into branching and labyrinthine forms. After sufficient editing, the pattern will have attained the desired geometry.

If the image produced in the preceding steps consists primarily of black and white with few gray values, a single scale, and the desired branching geometry, then proceed to step 235, else return to step 225 and continue forward through step 230 until reaching this junction again. In the case where the sharpen step is performed prior to the blur step, a check may be made after the sharpen step, or progress may be assessed based solely on single-scale dominance and branching geometry.

In step 235, blur step 220 is performed once more with the same values used previously, and then proceed directly to step 240. If the reverse value indicated below step 225 is used instead, with the sharpen filter being performed prior to the blur filter, step 235 is the normal end state of the cycle, and does not need to be repeated.

In step 240, the image is cropped to its original, pre-tiled size, retaining the center portion of the image and omitting the edges. Tile this image as before and check that all boundaries flow continuously into each other without significant visible edges or artifacts; if they flow continuously, the process has been performed correctly for this iteration. If not, the steps in FIG. 2 are repeated. The result is a single-scale Turing pattern 109.

FIG. 3 is a flowchart showing exemplary steps 300 for the integration of pre-made single-scale Turing patterns, as outlined in FIG. 2, into a multiscale Turing pattern denoted by processed phase pattern 106.

In step 305, according to FIG. 2 steps 205-240, a single-scale Turing pattern 109 is generated, where the radius selected is at the desired scale to serve as a disruptive macropattern for the object. In order to generate the pattern properly, a base desired scale for the symmetry-disrupting pattern is be selected. This is measured in radius, as both filters to be used have scalable areas they will sample from around a given pixel before acting on it. As an example, for a 1920×1152 source to be mapped to a 1500×900 mm set of rollers, a 48-pixel radius could be chosen for a human-disrupting scale. This base radius will be reused throughout the pattern while generating patterns of different sizes. It will vary based on pattern size in pixels, pattern scale relative to the object being camouflaged, and the nature of the object being camouflaged.

In step 310, an additional n iterations of Turing pattern 109(1)-109(n) are produced at multiple levels of scale, as outlined in FIG. 2. Each instance of Turing Pattern 109(*) [where "*" indicates one possible instance] is generated from a new tiled seed image 104, as described with respect to FIG. 2. Once all of the associated ½^n multiples of the base radius have been produced, processing proceeds with step 315.

In step 315, all instances of Turing Pattern 109 produced from FIG. 2 are overlaid onto the base version of pattern 109 from Step 305, placing the layer generated with the base value from Step 305 at the bottom and layering all other patterns 109 from step 310 on top of it. All patterns 109 forming the layers are set above the base layer to 'overlay' mode, so that they alter the base layer without reducing its salience in the resulting pattern 106. All layers are then merged together to produce processed phase pattern 106. Processing continues as pattern 106 is input to step 120, as shown in FIG. 1B.

Figure 4:
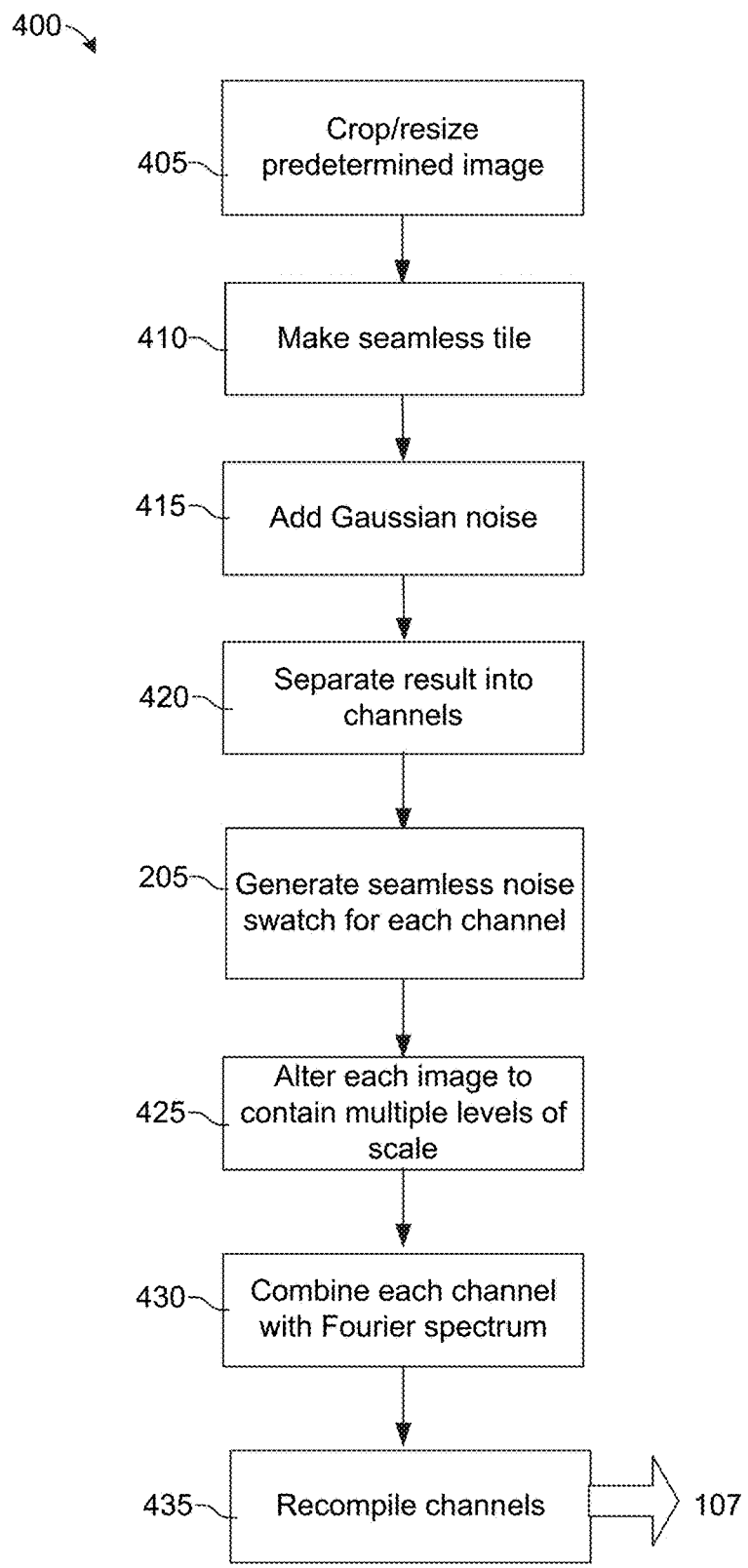
FIG. 4 is a flowchart showing exemplary steps for the implementation of the present method, using a pattern other than a Turing pattern.

FIG. 4 is a flowchart showing a set of exemplary steps 400 for the implementation of the present method for creating an intermediate output pattern 105, using a pattern other than a Turing pattern. As shown in FIG. 4, in step 405, a desired, predetermined input pattern 104 is selected, such as a preexisting camouflage pattern, and it is resized/cropped it to fit the needed size for the pattern.

In step 410, input 104 is altered to allow seamless tiling.

In step 415, in an exemplary embodiment, 25% Gaussian noise is added to the pattern.

In step 420, the result from step 415 is separated into channels, each of which is to be separately processed via steps 210-240 (FIG. 2). Alternately, steps 425-430 may be performed on a single full-color image, rather than on separate channels.

Step 215 in the FIG. 2 flowchart is then performed to find levels of scale.

Next, in step 425 (FIG. 4), each channel from step 420 Is altered to contain multiple levels of scale. Each red, green and blue channel from step 420 is split into a number of separate layers, and each is altered to contain only features at the desired level of scale. This may be done by applying steps 210-240 and 305-315 outlined in FIGS. 2-3, or via steps 705-730 in FIG. 7. The result is a processed phase pattern 106.

In step 430, each resulting multiscale pattern 106 is put through a Fast Fourier Transform filter. The phase data from each of these multiscale patterns is reserved. Each set of phase data is then combined separately with frequency data 101 or 102, corresponding to that of the environment of interest. The red channel phase data should be combined with the red channel of the environmental frequency data, the green channel phase data with the green channel of the environmental frequencies, and the blue channel phase data with the blue channel of the environmental frequency data. Each layer corresponding to the original color channels, comprising phase data from pattern 106 and signal 121a. then subjected to Inverse Fast Fourier Transform, such that the phase data of the patterns and the frequency data of the environments are combined.

In step 435, all channels are combined together into a full-color image, yielding intermediate output pattern 105. The red composite IFFT is placed in the red channel, the green composite IFFT in the green channel, and the blue composite IFFT in the blue channel. Histogram matching and color reduction may proceed as outlined in steps 122, 125, and 130. The final camouflage pattern 107 exhibits Turing pattern geometry, but with an arrangement and coloration similar to the original source image.

Figure 5:
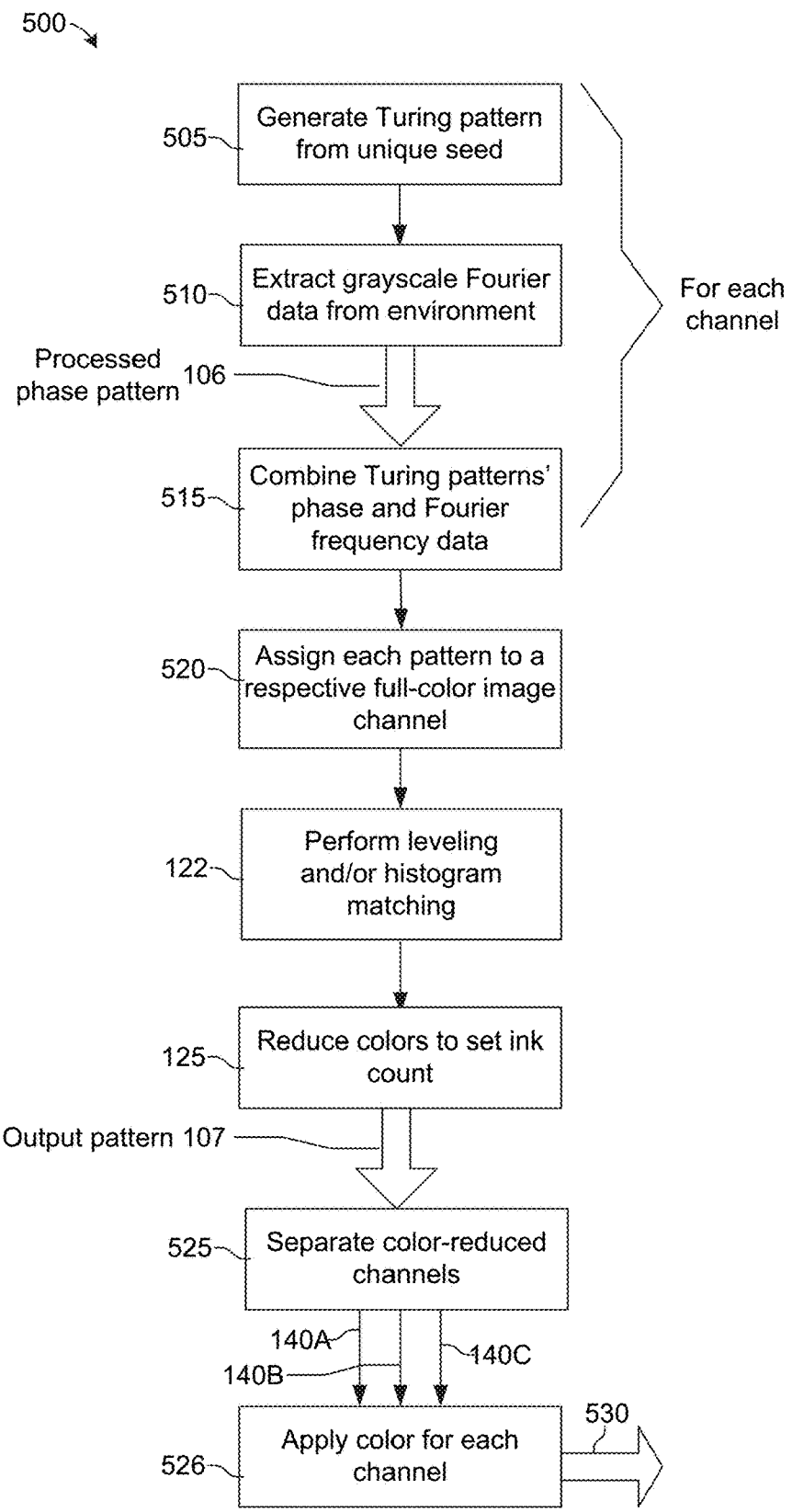
FIG. 5 is a flowchart showing exemplary steps for creating a multi-variant pattern.

FIG. 5 is a flowchart showing exemplary steps 500 for creating a multi-variant camouflage pattern 530. This involves the combination of a number of Turing composite patterns (which are all examples of processed phase pattern 106) with a number of Fourier frequency data sets, producing a composite pattern that is reduced to a set number of inks. These inks can be colored in a manner corresponding to each channel's luminances or the inverse of each channel's luminances, producing separate colorways. Each colorway has its own disruptive geometry and unique frequency data, allowing a single print pattern that can be recolored for multiple settings.

As outlined in 510, this method supports two or three separate patterns, one pattern per channel. RGB is optimal and allows for three channels and pattern options; CMYK offers four channels, but allows for information to be shared between the K channel and other channels, and so will be inappropriate.

In step 505, following FIG. 2, steps 205-240, separate Turing patterns are generated, with separate seed values. The mathematics for scaling may be tailored to each environment. Each channel is treated as an independent pattern in signal 104.

In step 510, grayscale (luminance only) Fourier frequency data representing a target environment is obtained.

In step 515, Each Turing pattern's phase from step 505 is combined with Fourier data signal 121b, via IFFT, from one environment as noted in step 510. The result is an intermediate output pattern (signal 105) with different phase data and Fourier frequency data in each of its channels.

In step 520, each pattern from step 515 is assigned to a channel in a full-color image—for example, a grayscale desert pattern could be assigned to the red channel, a grayscale transitional pattern to green, and a grayscale woodland pattern to blue. This step is exemplary of a three-colorway pattern with three independent color channels.

Step 122 in FIG. 1B is then performed in such a way that the channels are leveled, so that all have equivalent light and dark values, contrast, and overall average brightnesses.

Next, step 125 is performed, reducing to either a programmatically-determined palette or a user-defined color palette. The result is an output pattern 107, where color assignment prior to processing through signal 136 into multiple variants of output 140 is detailed in step 525.

In step 525, color-reduced channels are separated out from each other, yielding (in this example) three separate, color-reduced outputs 140A, 140B, 140C, all with shared geometry, only differing in color assignment. The resulting three color-reduced outputs correspond to color channels, with 140A corresponding to the R channel, 140B corresponding to the G channel, and 140C corresponding to the B channel, assuming an RGB system.

In step 526, appropriate environmental colors are applied to channels 140A, 140B, and 140C, following the shapes when applying color and luminance values to determine the assignment of light and dark colors (lightest color to lightest luminance value, darkest color to darkest luminance value, etc). If the resulting colorized output 140(A, B, or C) is too light- or dark-dominant, color assignment may be inverted for more environmentally-appropriate proportions (lightest color to darkest luminance value, darkest color to lightest luminance value, etc), as long as the order of dark-to-light in the output 140(A, B, or C) is maintained. The result is a single geometry, camouflage pattern 530, wherein colors may be applied in multiple fashions corresponding to Outputs 140 (here A, B and C) to produce different colorways, suitable for different terrains and environmental conditions.

Figure 6:
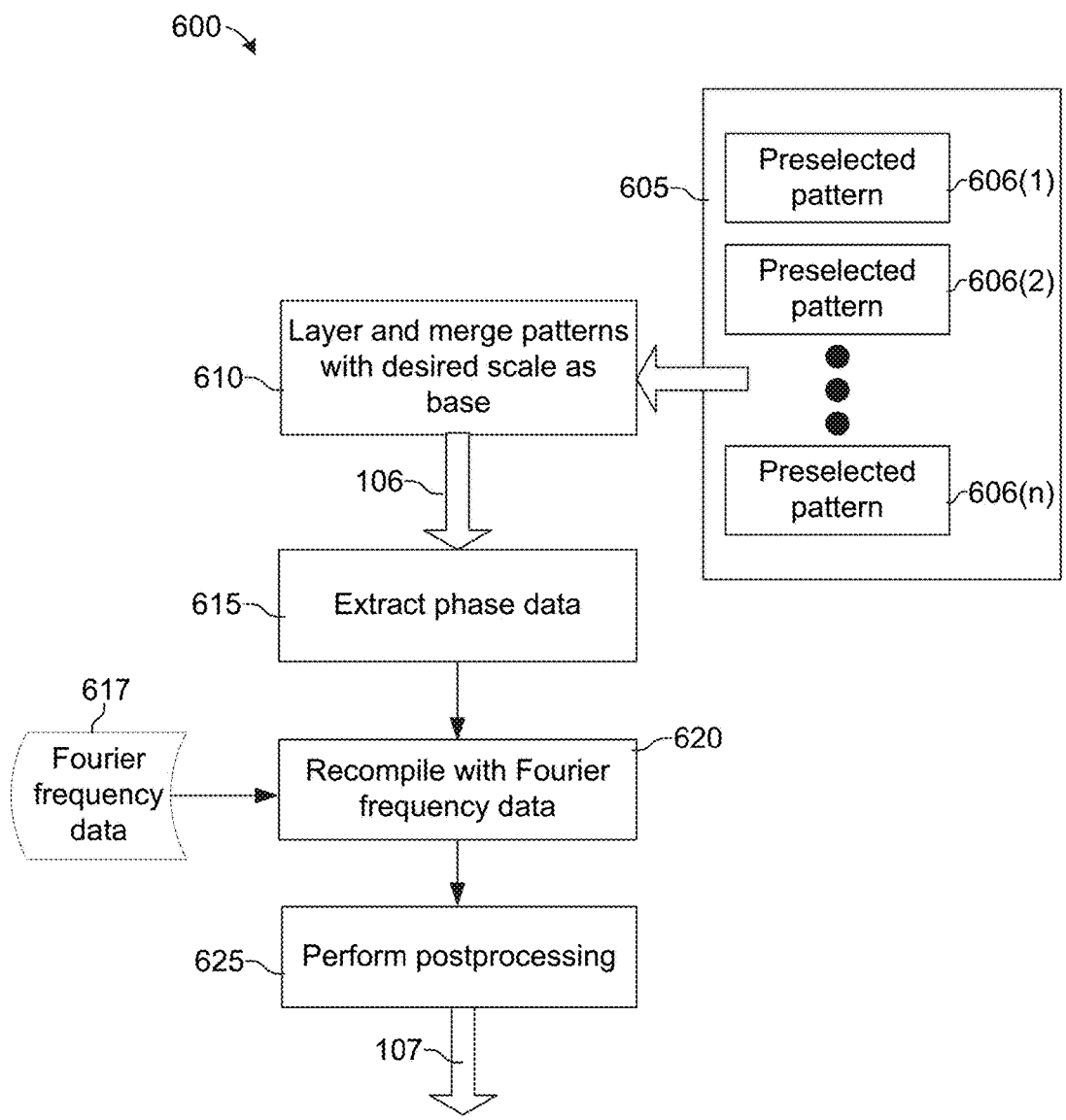
FIG. 6 is a flowchart showing exemplary steps for generating a non-Turing multiscale pattern.

FIG. 6 is a flowchart showing exemplary steps 600 for generating a non-Turing multiscale camouflage pattern 107.

In step 605, generated tileable patterns 104 that are of equal size, but with features exhibiting different levels of scale, are imported. The levels of scale may be determined as in step 205, FIG. 2. The patterns 104 are disparate in the scale of their features, to an extent that the features may be described as varying sizes scaling as multiples of an equation such as k/f^n, where e.g. k is equal to 1, f is equal to 2, and n embodies a range from 0.9 to 1.2.

In step 610, the patterns 104 are layered together, with the pattern of the desired scale at the bottom and the remaining patterns 104 composited onto it via Photoshop's 'overlay' mode or the analogous mode if using another program.

In step 615, the patterns are merged into a single layer, resulting in a processed phase pattern 106, and a Fast Fourier Transform is performed to extract phase data.

In step 620, the phase data is recompiled with Fourier spectrum data (signal 617) via Inverse Fast Fourier Transform. The resulting processed images are assigned to corresponding color channels, yielding an Intermediate output pattern 105.

In step 625, histogram adjustments and color reduction are performed to conform the pattern to whatever color scheme or color histogram is determined to be desirable, to generate a non-Turing multiscale camouflage pattern 107.

FIG. 7 is a flowchart showing exemplary steps 700 performed in generating processed phase pattern 106', amenable for use as phase data for a varied multiscale Fourier spectrum, via a method of recursive processing at differing subsequent scales, rather than the overlaying of multiple patterns at multiple levels of scale, as exemplified by FIGS. 2 and 3.

In step 701, pattern 104 is selected. In step 705, steps 210-235 (FIG. 2) are performed on signal 104, resulting in a single-scale Turing pattern 109. This constitutes a single processing cycle in FIG. 2.

In step 710, contrast is increased so that the single-scale Turing pattern 109 is dominated by true black and true white. In step 715, a seamless 'crystallize' filter, or similar size-dependent filter, is applied to the to single-scale Turing pattern 109. The filter's radius should be set to the largest radius obtained as outlined in the process outlined under the 'Scaling' section in FIG. 2, prior to step 220.

In step 720, the filter is applied at the next smaller radius, obtained via the process outlined in 'scaling' in step 215. At step 725, if the smallest radius has not been reached, then step 720 is again performed, at next smaller radius. Otherwise, processing continues at step 730.

In step 730, if a large quantity of grayscale data remains, contrast on the processed single-scale Turing pattern is increased until it reaches a desired contrast level, optimally dominated by true black and true white.

In step 735, the resulting pattern, processed phase pattern 106', is implemented in steps 115-130 in FIG. 1B in the place of processed phase pattern 106, performing the subsequent IFFT and remaining steps 120-130 (alternatively, steps 120-135), to yield Output Pattern 107.

Figure 8:
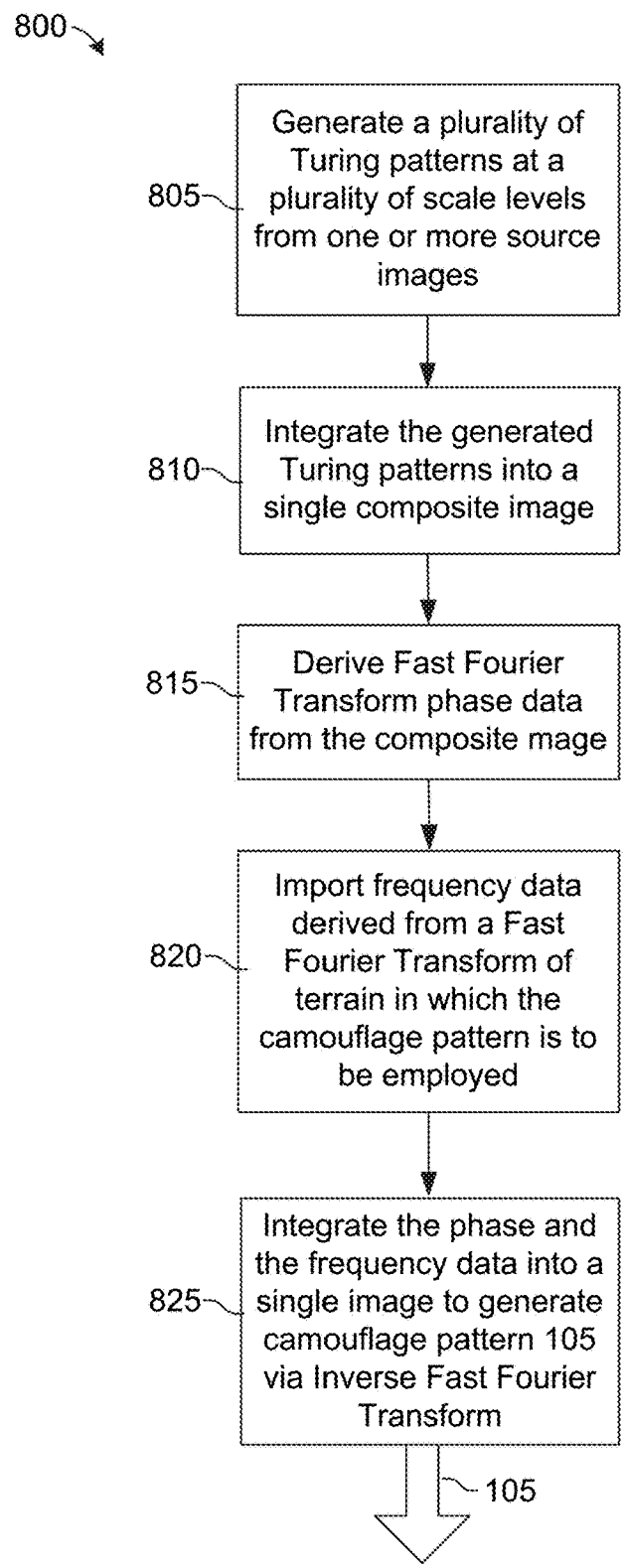
FIG. 8 is a flowchart showing an alternative exemplary embodiment of the method of the present invention.

FIG. 8 is a flowchart showing an alternative exemplary embodiment 800 of the method of the present invention. As shown in FIG. 8, at step 805, a Turing pattern 108 is generated as a basis for macropatterning, and constructed in such a way as to include elements of differing sizes at additional levels of scale, as may be determined in step 215 and performed via the exemplary use of additional Turing patterns (FIGS. 2-3), image filters (FIG. 7), or additional Turing algorithms applied to the base pattern (FIG. 9).

Fast Fourier Transform phase data is then extracted from the composite image via FFT in step 815. In step 820, Fourier frequency data 121, corresponding to that of the terrain in which the camouflage pattern is to be employed, is imported. Finally, in step 825, the phase and the frequency data is integrated and processed via IFFT to generate intermediate output pattern 105 via Inverse Fast Fourier Transform.

Figure 9:
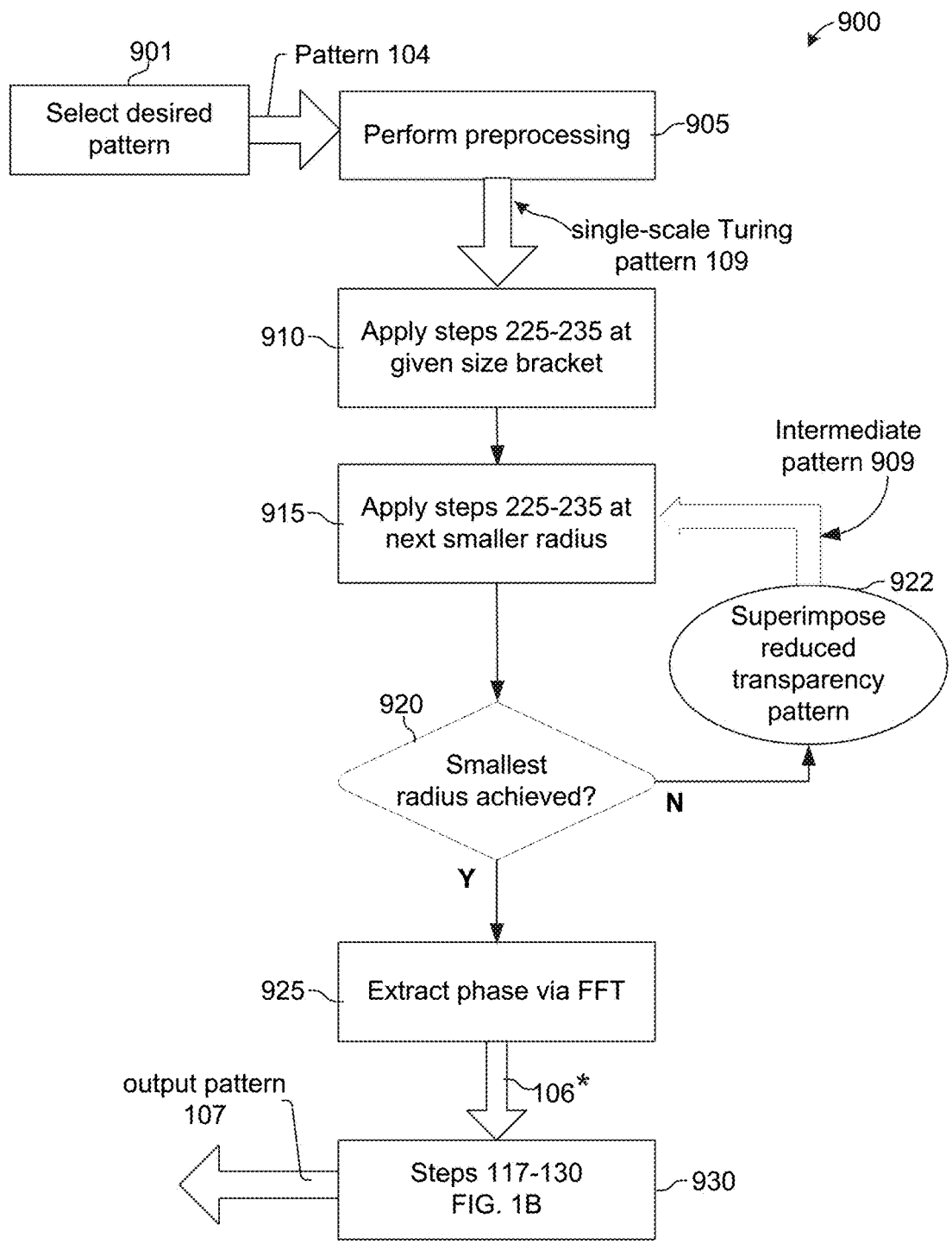
FIG. 9 is a flowchart showing an alternative exemplary embodiment of the method of the present invention, in which a single Turing pattern is modified at multiple scales via repeated use of a Turing-generating blur-sharpen algorithm at multiple scale levels.

FIG. 9 is a flowchart showing an alternative exemplary embodiment 900 of the method of the present invention, in which a single Turing pattern is modified at multiple scales via repeated use of a Turing-generating blur-sharpen algorithm at multiple scale levels, rather than by application of a non-Turing-generating filter at multiple scale levels. In step 901, original pattern 104 is selected. In step 905, steps 210-235 (FIG. 2) are performed on signal 104, generating a single-scale Turing pattern 109. Steps 210-235 in FIG. 2 constitute a single processing cycle.

In step 910, steps 210-235 are performed on single-scale Turing pattern 109 at the next smallest level of scale, as may be derived in step 220.

In step 915 steps 210-235 are applied at the next smaller radius, with radii obtained via the process outlined in 'scaling' in step 215 to generate Intermediate Pattern 909.

At step 920, if the smallest radius has not been reached, step 922 is performed, adding the original pattern 104 at reduced transparency to intermediate pattern 909. Step 915 is then again performed, at next smallest radius. When the smallest radius is achieved, as determined in step 215, producing composite pattern 919. intermediate pattern processing continues at step 925.

In step 925, a Fast-Fourier transform is performed on composite pattern 919 to extract its phase data, generating signal 106*. Per step 930, steps 117-130 in FIG. 1B are then performed, implementing signal 106* as phase data, combining said phase data with Fourier frequency data via IFFT. Output pattern 107 is the resulting camouflage pattern.

Having described the invention in detail and by reference to specific embodiments thereof, it will be apparent that modifications and variations are possible without departing from the scope of the invention defined in the appended claims. More specifically, it is contemplated that the present system is not limited to the specifically-disclosed aspects thereof.

What is claimed is:

1. A method for generating a camouflage pattern comprising:
   generating at least one Turing pattern containing elements of differing sizes at differing levels of scale;
   extracting phase data from the at least one Turing pattern via Fast Fourier Transform (FFT);
   gathering Fourier frequency data corresponding to a terrain in which a camouflage is to be employed; and
   combining the phase data with the Fourier frequency data via Inverse Fast Fourier Transform (IFFT) to yield the camouflage pattern.

2. The method of claim 1, the at least one Turing pattern including a Turing pattern generated from a preexisting image.

3. The method of claim 1, the at least one Turing pattern including a Turing pattern generated from one or more noise samples.

4. The method of claim 1, the at least one Turing pattern including a Turing pattern generated from a tileable non-Turing pattern including Perlin noise.

5. The method of claim 1, wherein the camouflage pattern is postprocessed via matching its color histogram to environmental data, then reduced to a plurality of colors suitable for printing.

6. The method of claim 1, wherein the at least one Turing pattern containing elements of differing sizes at differing levels of scale is produced by:
   generating a Turing pattern;
   applying one or more filters to said Turing pattern a plurality of times;
   setting the radius of each of the one or more filters to a given scale;
   applying the each of the one or more filters through smaller radii until a smallest radius is reached.

7. The method of claim 1, wherein the at least one Turing pattern containing elements of differing sizes at differing levels of scale is produced by:
   generating a Turing pattern;
   repeating a process for generating a modified Turing pattern on said Turing pattern, each repetition proceeding through smaller radii until a smallest radius is reached, to generate the modified Turing pattern; and
   extracting phase data from the modified Turing pattern via FFT, and combining, via IFFFT, the phase data with Fourier frequency data corresponding to a terrain in which the camouflage pattern is to be employed, to yield the camouflage pattern.

8. The method of claim 1, wherein the steps of generating, extracting, gathering and combining are independently performed a plurality of times to generate a plurality of corresponding independent intermediate output patterns;
   setting each of the intermediate output patterns to a different color channel in a multichannel image; and
   reducing colors of the multichannel image to yield a single geometry; such that coloring the resulting geometry according to each said color channel yields a differing colorway.

9. The method of claim 1, wherein the at least one Turing pattern containing elements of differing sizes at differing levels of scale is produced by:
   generating a plurality of Turing patterns at a plurality of scale levels from one or more source images;
   merging the generated Turing patterns into a single composite image;
   deriving Fast Fourier Transform phase data from the composite image;
   importing Fourier frequency data corresponding to target environments in which the camouflage pattern is to be employed; and
   combining the phase and the frequency data into a single image by applying an Inverse Fast Fourier Transform, to generate the camouflage pattern.

10. The method of claim 9, wherein all of the Turing patterns are generated from one or more noise samples.

11. The method of claim 9, wherein all of the Turing patterns are generated from one or more samples of tileable non-Turing patterns.

12. The method of claim 9, wherein the Turing patterns are generated from multiple source images.

13. The method of claim 9, wherein the steps of generating at least one Turing pattern containing elements of differing sizes at differing levels of scale, extracting, gathering and combining are independently performed a plurality of times to generate a plurality of corresponding independent intermediate output patterns;
   setting each of the patterns to a different color channel in a multichannel image; and
   reducing colors of the multichannel image to yield a single geometry; such that coloring the resulting geometry according to each said color channel yields a differing colorway.

14. A method for generating a camouflage pattern comprising:
   generating a plurality of tileable non-Turing patterns, wherein each of the generated tileable patterns is disparate in the scale of its features;
   layering the generated tileable patterns into a single layer and performing an Fast Fourier Transform (FFT) on the single layer to extract phase data; and recompiling the phase data with Fourier spectrum data via Inverse Fast Fourier Transform (IFFT) to yield the camouflage pattern.

15. The method of claim 14, wherein each of the generated tileable patterns includes a range of size elements corresponding to size elements observed in a terrain in which the camouflage pattern is to be employed.

16. The method of claim 14, wherein the camouflage pattern is postprocessed via matching its color histogram to environmental data, then reduced to a plurality of colors suitable for printing.

17. The method of claim 14, wherein the steps of generating, layering, and recompiling are independently performed a plurality of times to generate a plurality of multiscale camouflage patterns;
   assigning each multiscale camouflage pattern to a different color channel in a multichannel image; and
   reducing the colors of the multichannel image to yield a single geometry such that coloring the resulting geometry according to each channel yields a differing colorway.

18. A method for generating a camouflage pattern comprising:
   generating a Turing pattern at a single scale, incorporating additional scale levels at appropriate intervals into a composite image;
   deriving Fast Fourier Transform phase data from the composite image;
   importing frequency data derived from a Fast Fourier Transform of a terrain in which the camouflage pattern is to be employed; and
   integrating the phase and frequency data into a single image to generate the camouflage pattern via Inverse Fast Fourier Transform.

19. The method of claim 18, wherein the camouflage pattern is postprocessed via matching its color histogram to environmental data, then reduced to a plurality of colors suitable for printing.

20. The method of claim 18, wherein the steps of generating, deriving, importing, and integrating are independently performed a plurality of times to generate a plurality of multiscale camouflage patterns;
   assigning each multiscale camouflage pattern to a different color channel in a multichannel image; and
   reducing the colors of the multichannel image to yield a single geometry; such that coloring the resulting geometry according to each channel yields a differing colorway.

* * * * *